and their accumulation gives the image. The law for how the
subject changes with time is evaluated and is used to
compensate for partial results before their accumulation.

(12) United States Patent
Koenig et al.

(10) Patent No.: US 6,888,915 B2
(45) Date of Patent: May 3, 2005

(54) METHOD FOR RECONSTRUCTION OF AN IMAGE OF A MOVING OBJECT

(75) Inventors: Anne Koenig, St Martin d'Village (FR); Pierre Grangeat, Saint Ismier (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/480,742

(22) PCT Filed: Jun. 14, 2002

(86) PCT No.: PCT/FR02/02044

§ 371 (c)(1),
(2), (4) Date: Dec. 11, 2003

(87) PCT Pub. No.: WO02/103637

PCT Pub. Date: Dec. 27, 2002

(65) Prior Publication Data

US 2004/0170246 A1 Sep. 2, 2004

(30) Foreign Application Priority Data

Jun. 15, 2001 (FR) .............................................. 01 07918

(51) Int. Cl.[7] .................................................. A61B 6/03

(52) U.S. Cl. .............................. 378/8; 378/15; 378/901

(58) Field of Search ............................. 378/4, 8, 15, 19, 378/901

(56) References Cited

U.S. PATENT DOCUMENTS 6,341,179 B1 * 1/2002 Stoyle et al. ................ 382/254
6,421,552 B1 * 7/2002 Hsieh .......................... 600/425

OTHER PUBLICATIONS

Schäffter, et al., "Motion Compensated Projection Reconstruction", 1999, Magnetic Resonance in Medicine, vol. 41, pp. 954–963.

* cited by examiner

*Primary Examiner*—David V Bruce
(74) *Attorney, Agent, or Firm*—Thelen Reid & Priest LLP

(57) ABSTRACT

A very fast reconstruction is undertaken in an image reconstruction process by tomography, by dividing measurements through the subject into a series of subsequent sets that are inverted by back projections giving partial result blocks used to search for the change law for the subject. Partial contents of the image can then be predicted at a reference time and their accumulation gives the image. The law for how the subject changes with time is evaluated and is used to compensate for partial results before their accumulation.

11 Claims, 4 Drawing Sheets

METHOD FOR RECONSTRUCTION OF AN IMAGE OF A MOVING OBJECT

This invention relates to a process for reconstruction of an image of a moving subject.

Reconstruction of images by tomography consists of taking sets of successive measurements of the subject by a network of detectors rotating about the subject. The property expressing the image is measured along rays passing through the subject and leading to different detectors. Therefore, detector measurements are the sums of the property along projection rays. When a sufficient number of measurement sets has been taken at different incidences of the detectors network, a reconstruction is made comprising a digital filtering step followed by a so-called back projection step to deduce the value of the property at each point of the subject after the measurements. The process mentions the resolution of a system of large linear equations, although the reconstruction is normally done using digital techniques that are different from the techniques used to invert a matrix; back projection is more like a redistribution of filtered measurements on the subject along the projection rays.

The situation is more difficult when the subject changes by moving or deforming during the measurements, since the set of measurements taken at different states of the subject are not immediately comparable, since an intersection point of rays measured at different instants no longer corresponds to a single point on the subject. This problem always arises if the subject is an animated being that breaths with a heart that is beating while the measurements are being taken. Another cause of measurement variations that aggravates the previous problem is when the measurement relates to scintillation of a radioactive marker ingested by the subject and for which the concentration reduces during the measurement, or when a contrast product such as an opacifying product is injected into the vascular network of a patient.

One elementary process for overcoming this disadvantage consists of taking measurements simultaneously with a large number of detector networks, but this is too expensive in practice. A correction process that is occasionally used consists of only taking measurements at identical states of the subject, and particularly in the same phase of the heart rhythm, and ignoring variations of the subject, but synchronisation of measurements is difficult and periodic changes are necessary.

Different processes for reconstruction of the three-dimensional image have been imagined, by correcting variations of the subject. In French patent application 2 749 957, measurement sets give a sequence of primitive images from which an estimate of the movement is extracted. Primitive images are then improved by applying a threefold correction to them consisting of spatial regularisation, time regularisation and matching to measurements. The spatial regularisation consists of image smoothing to eliminate its irregularities. Matching to measurements is achieved by calculating projections of the corrected image and comparing them with actually measured projections. Only the time regularisation uses an estimate of the movement, by evaluating the extent to which points identified on the successive images obey this law. It might be feared that the improvement is only superficial and cannot be obtained in all situations. The measurement volume is high, and there are many iterative correction calculations.

In French patent 2 736 454, a series of successive primitive images of the subject is calculated, and then an attempt is made to converge towards a final image of the subject by recurrence, by successively incorporating the contents of successive images into an estimate of the final image while using a mathematical operator expressing deformation of the subject from one primitive image to another, and that is estimated by comparing images. In this case there are still many measurements and calculations. A set of complete measurements must be acquired for each state of the subject to give the primitive image.

We will mention French patent 2 701 135, in which measurements were corrected using a subject change law that is estimated, but reconstruction uses algebraic methods (that involve an inversion of the system of equations) that make it impossible to start the calculations until after the measurements have finished. There are many of these iterative reconstruction calculations.

The article entitled "Motion Compensated projection reconstruction" by Schaffter et al. published in "Magnetic resonance in medicine", May 1999, Wiley, USA, vol. 41, No. 5, p. 954 to 963, describes a process for reconstruction of images firstly by forming simplified images by making measurement selections and then these images are combined while evaluating a subject change law.

However, the simplified images are complete images, in other words they actually represent the subject and are therefore comparable, each originating from measurements taken in all directions; measurement sets are interlaced, and simplified images are obtained after a complete turn of the detectors network.

Therefore, we need a process that can be used in real time, in other words that is capable of giving an image of the subject almost immediately after taking the measurements, without necessitating a large volume of measurements or long calculation times, while being capable of processing measurement acquisition protocols in which the subject moves continuously from one measurement to the next, while it was assumed to be motionless while taking each set of measurements with ordinary processes. It should be emphasised that calculation times are one of the main reasons for the inaccuracy of images in tomography, since they increase very quickly with the number of points (or more specifically with the number of voxels), used to discretise the subject and the number of instants to be considered, and therefore which have to be limited. It is also desirable to minimise measurements so as to reduce the dose received by the subject when being irradiated.

The purpose of this invention is to reconstruct an image quickly starting from a reduced set of measurements without any condition on the rate of change of the subject.

One essential feature of this invention is that there is no need to obtain a sequence of primitive images of the subject to correct them using a subject change law, either derived from these primitive images or known by some other means. In this case, a single image is obtained directly from the back projections determined by successive blocks on portions of measurement sets. Corrections due to changes in the subject are made on partial results of back projections, rather than on successive images of the subject. The subject change law can be determined as the measurement sets are taken.

Partial back projections give corresponding result blocks, using a number of measurements that is too small to genuinely generate the required image, but that can be corrected using the image change law that is determined in parallel. When this correction is made, a combination of blocks gives the image of the subject. The subject is treated like a collection of particles for which movements are followed along the traces of their path on the different back projection blocks and for which values are determined by accumulating their values along these paths.

The process proposed here is very fast since measurement blocks can be back projected and then used as soon as the portion of the trajectory for acquiring these blocks has been obtained, and this is achieved in only a fraction of a turn. The volume of results manipulated in each block is relatively small. Admittedly, the subject change law cannot be applied until the first images have been obtained around at least half a turn of the trajectory, but the volume and duration of the calculations can be reduced by undersampling the measurements to give first very simplified images but which are sufficient, and that can be treated in real time, while measurement acquisitions are continued.

The process according to the invention is also capable of taking account of variations of the subject with time using linear regression techniques and introducing confidence factors to make the algorithm more robust to different movement estimating errors (appearances, disappearances, inaccuracies or indeterminacy problems in creating correspondence). It also provides a means of introducing aversion techniques to reduce radar artefacts.

In its most general form, the invention relates to a process for reconstruction of an image of a moving subject, including taking a set of successive measurements of the subject on projection rays passing through the subject, through a network of detectors at corresponding incidences around the subject, a measurement back projection step and a correction step following a subject change law, characterised in that the back projection step is made in several steps to give corresponding blocks of back projection results, each of the blocks grouping projection rays taken only for an angular sector of a turn of incidences in the detectors network; the subject change law is estimated based on the first images obtained by accumulating back projection blocks on at least half a turn of incidences of the detectors network; and the back projection result blocks are combined after they have been corrected using the subject change law to give the image at a reference time.

The change law may include variations with time of the appearance of the subject, and in one important embodiment of the invention, the said variations are estimated by regression calculations between the corresponding portions in the first images resulting from accumulations of back projection result blocks; or displacements of portions of the subject, and the said displacements are estimated by distance searches between similar portions of the said first images.

These first images are not used in the reconstruction itself of the final image, unlike what is done for normal processes, but simply for the estimate of the change law. They will frequently be blurred by undersampling of measurements, which is accepted to accelerate the estimate. The user can also input the change law if he knows it, or other sensors may be used to input the change law in other embodiments of the invention.

The change law may be estimated in steps and updated, even while measurements and back projection blocks are still being obtained.

We will now describe various aspects of the invention with reference to the figures.

Figure 2:
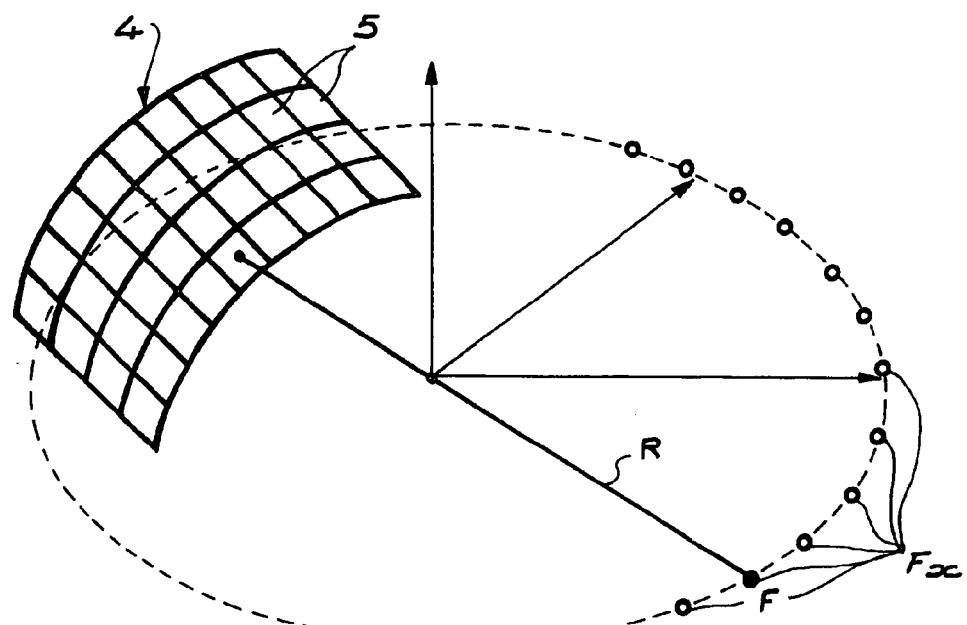
FIGS. 2 and 3 show two detector networks.

A conventional type of computerized tomography scanner on which the invention would be perfectly suitable comprises a table 1 on which a patient to be examined is lying, and an annular frame 2 containing a detection system 3. The table is pushed into the central hole of the frame 2 until it surrounds the region of the patient to be examined, and the detection system 3 then rotates about the patient as many times as necessary to take measurements throughout the duration of the phenomenon to be observed. FIG. 2 shows a diagram of how the measurements are taken and shows that the detection system 3 comprises a two-dimensional network 4 that may be cylindrical, of elementary detectors 5 in order to rebuild a three-dimensional image; this is the most general case, but the invention will equally be applicable to a linear network of detectors that is free to move in the same way, to reconstruct a two-dimensional section through the subject. Each of the detectors 5 is collimated to a focus F that, depending on the case, may be occupied by a radiation source or it may be a single immaterial point. In both cases, each detector 5 takes a measurement all along a ray R associated with it and which leads to the focus F. Most of the rays R pass through the patient to be examined. If the focus F corresponds to an emission source, the measurements are radiation attenuation measurements along the ray R; otherwise radiation may be emitted by the patient himself or herself, particularly after ingesting a radioactive tracer, and is measured along the rays R. For a given position of the focus F, all detectors 5 in the network 4 take a set of measurements. A series of measurement sets are then taken in sequence at positions usually referenced by Fx of the focus F, distributed along a circumference to obtain sufficient information to rebuild the subject. The network 4 moves at the same time so that the focus F can be in the different positions Fx in sequence.

Figure 3:
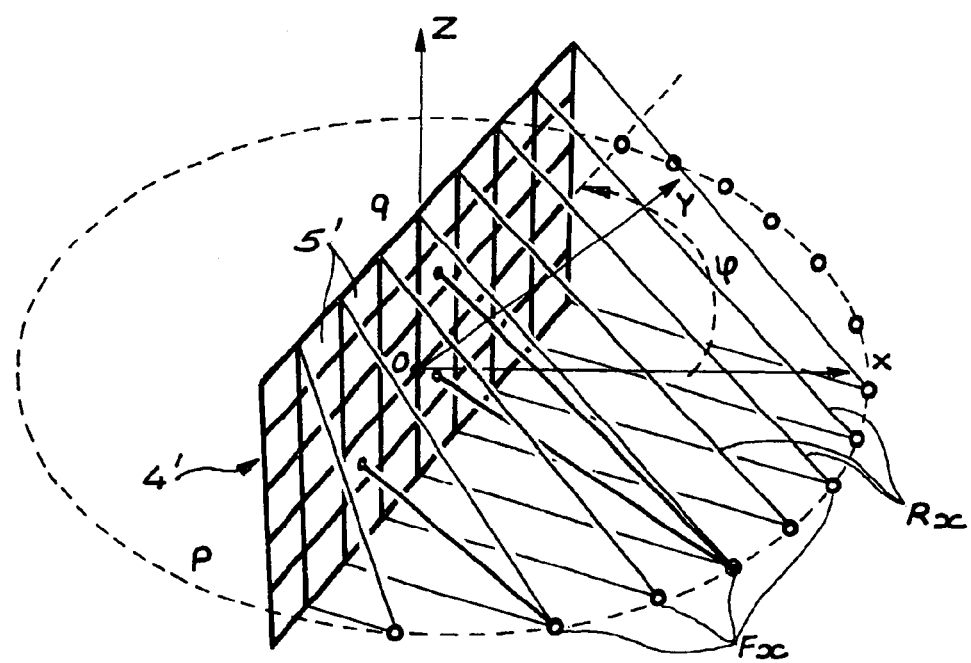

The back projection algorithms used after digital filtering of detector measurements 5, are used to deduce the value of the attenuation or emission property f at each point on the subject to be examined (in this case the patient) starting from the sums of this value on the projection rays R intersecting through the subject. Reconstruction is complete when the value of the property f is obtained for the different subject discretisation points (voxels), which gives the image. These algorithms are associated with particular forms of the detectors network 4. Collimation of detectors 5 described in FIG. 2 is conical towards a point focus F and therefore requires corresponding back projection algorithms. However, different algorithms are frequently used after doing what is called a rearrangement of the projections. As shown in FIG. 3, a judicious choice of rays R made at different positions Fx of the focus F may be associated with detectors 5' of a dummy network 4' that would be collimated in parallel fans, each row of detectors 5' being collimated to a corresponding focus in parallel planes. The rearrangement consists of making this association of rays R with the dummy network 4'; specific back projection algorithms for networks in parallel fans can then be applied as if the sets of measurements had been made by the dummy network 4'. Usual notations are shown in FIG. 3; three fixed axes x, y and z are used to measure Cartesian coordinates of points on the subject to be examined, the z-axis being the axis of rotation of the detection system 3 and the focus F rotating in the plane of the x and y axes; the angle $\phi$ gives the angular position of the network 4' with respect to the x axis; the coordinates p and q give the positions of the detectors 5' in the network 4' perpendicular to and parallel to the z axis.

The process according to the invention considers blocks of measurement sets taken successively, at a given angular interval of the focus F, that may be included between an origin angle $\phi b$ and $\phi b+\pi/3$. The process may be applied to different total angles of rotation of the measurement system 3, typically π, 2π, 3π and 4π (from one to four half turns), to which it is useful to add an overscan, for example equal to π/3; this known technique is useful for dealing with truncated measurements introduced by the time window. Therefore, there are six blocks of measurement sets for each turn of the network 4 or 4' of detectors 5 or 5', and the back projection algorithm is applied in each block to give the same number of back projection result blocks that correspond to fragments of the contents of the image of the examined subject that will be exploited, even though they are not sufficiently complete to make the image to be obtained individually.

Back projection by blocks is done using conventional digital filtering, that can be expressed by formula (1) below in which P denotes measurement by a detector 5' with coordinates p and q for an orientation φ, w is a weighting function and h is an image reconstruction filter such as a ramp filter; fb denotes the estimate of the function giving the image for this back projection block at the point on the subject with coordinates x, y and z, and C is a normalisation factor that is equal to 1 if the filter h is normalised:

$$fb(x, y, z) = \frac{1}{C} \int_{\varphi=\varphi b}^{\varphi=\varphi b+\pi/3} [(P(\varphi, p, q)w(p, q)) * h(p)] d\varphi \quad (1)$$

The weighting function satisfies the formula (2):

$$w(p, q) = \frac{\sqrt{R_0^2 - p^2}}{\sqrt{R_0^2 - p^2 + q^2}} \quad (2)$$

where $R_0$ is the distance between the focus F and the origin O of the x, y and z axes.

In the above example, the measurements were made on slightly more than two complete turns of the network 4, giving thirteen blocks with an angular width equal to π/3 distributed between the angles $$\varphi = -\frac{13\pi}{3}$$

and φ=0 at the start and end of the measurements.

The back projection result blocks obtained by formula (1) are marked with the general reference $f_{bi,j}$ where j denotes the group to which each block belongs and i is its order number in this group. Blocks in the same group are at a spacing of π (or 2π in other embodiments) and thus correspond to identical or opposite angular sectors of measurements taken. According to FIG. 4, in which angular sectors are indexed in increasing values starting from the origin φ=−13π/3 until the end of measurements (φ=0), the first group (j=1) includes blocks $f_{b4,1}$, $f_{b3,1}$, $f_{b2,1}$, and $f_{b1,1}$ beginning with angles φ=−4π, −3π, −2π and −π. The blocks $f_{bi,j}$ are associated with the corresponding times $t_{bi,j}$ where their angular sectors are complete and in which the back projections by blocks $f_b$ may be undertaken and which correspond to times at which the focus F passes through the angles −2π/3, −5π/3, −8π/3 and −11π/3. In this case, the third group comprises the overscan block $f_{b5,3}$ between angles $$\varphi = -\frac{13\pi}{3}$$

and −4π. The process for reconstruction of the image for this group of back projection blocks consists of doing a linear regression on the back projection results $f_{b1,1}$, $f_{b2,1}$, $f_{b3,1}$ and $f_{b4,1}$ to obtain a predicted back projection value $f_{bj}(t_r)$ at a reference time $t_r$, as will be described in a few lines. The same operation is done for back projection blocks for groups j=2 and j=3. Finally, the predicted values $f_{bj}(t_r)$ are accumulated to give the image f of the subject at time $t_r$, as is suggested in FIG. 5. The accumulation consists of a sum and can be represented by formula (3):

$$f(t_r) = \sum_{j=1}^{3} f_{bj}(t_r) \quad (3)$$

Figure 4:
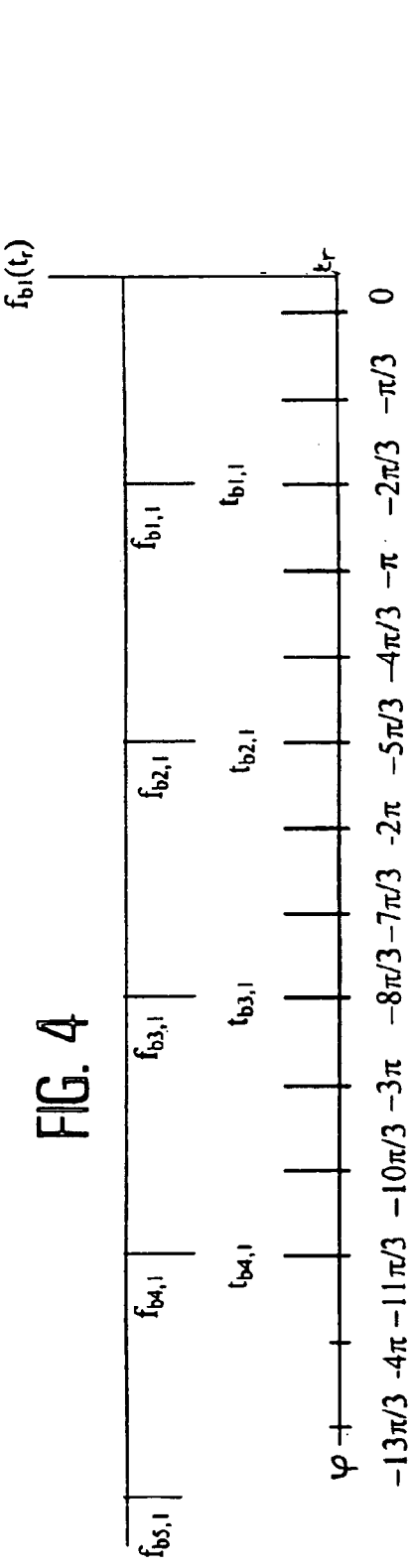
FIGS. 4 and 5 show two result grouping steps.
Figure 5:
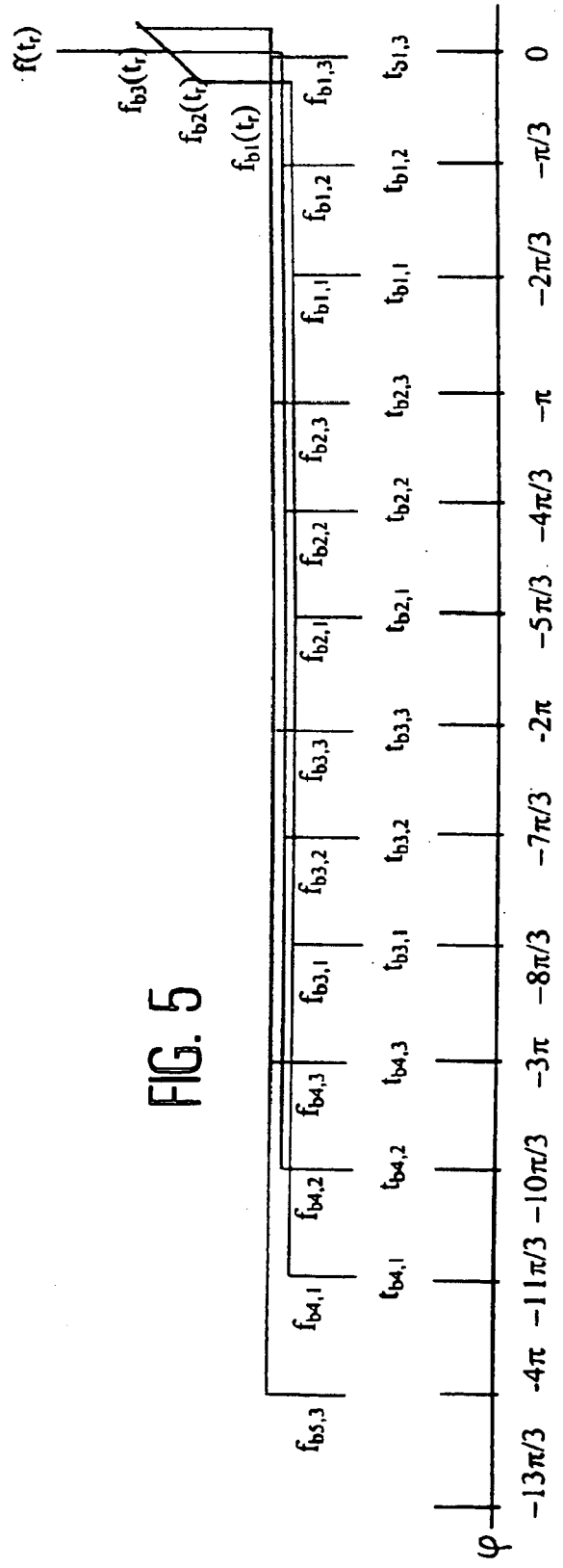

The reference time $t_r$ may be arbitrary, after the end of the measurements according to FIG. 4, at the same time as the end of the measurements as suggested in FIG. 5, or before the end of the measurements. In any case, the same results $f_{bi,j}$ are used.

The predicted values of the back projection blocks at a reference time $t_r$ are obtained as follows. A back projection of a point M on the subject at an angle φ and a detection time $t_\varphi$ may be denoted more simply using formula (4):

$$t_\varphi = \frac{\varphi - \beta_0}{\omega} \quad (4)$$

where $\beta_0$ and ω are the origin orientation of the network 4 or 4' and its angular speed.

It is assumed that the variation of the back projection value of point M with time satisfies a simple prediction rule as follows (5):

$$f(M,\varphi,t) = a(M,\varphi,t_r)(t-t_r) + b(M,\varphi,t_r) \quad (5)$$

therefore the factors a and b denoting linear variation parameters of the function f with time.

The coefficients a and b may be estimated by the linear regressions inside each group j, according to either of the following formulas (6) and (7) below, corresponding to what are called order zero and one regressions:

$$\begin{cases} a_j = 0 \\ b_j = \dfrac{\sum_i Cij^2 y_{ij}}{\sum_i Cij^2} \end{cases} \quad (6)$$

$$\begin{cases} a_j = \dfrac{2\sum_i Cij^2 Y_{ij} \sum_k C_{kj}^2 (t_{bij} - t_{bkj})}{\sum_i Cij^2 C_{kj}^2 (t_{bij} - t_{bkj})^2} \\ b_j = \dfrac{2\sum_i Cij^2 Y_{ij} \sum_k C_{kj}^2 (t_{bkj} - t_r)(t_{bkj} - t_{bij})}{\sum_k Cij^2 C_{kj}^2 (t_{bij} - t_{bkj})^2} \end{cases} \quad (7)$$

where $y_{ij}$ is equal to $f_{bj}(t_{bi,j})$ and $C_{ij}$ denotes a confidence coefficient for back projections of a result blocks. In these formulas, the coefficients $C^2_{ij}$ could be replaced by $C^2_{ij} w^2_{ij}$, where $w_{ij}$ would denote time confidence factors that could arbitrarily be chosen at times that would preferably be used for the reconstruction calculations, or undersampling the end blocks could be used for an overscan; the $w^2_{ij}$ factors could then be equal to ½ for the first and last blocks, and to 1 for all other blocks.

Confidence factors $C_{ij}$ can be assigned arbitrarily depending on the importance to be given to each block, or as described later. The predictive formula (3) is applicable without change if the subject is motionless. If the subject is moving or deforming, processing by accumulation in the groups will be more complicated; accumulations of results $f_{bi,j}$ between blocks in the same group j will make each point M in the first block correspond to a point M' in another block that was correlated to point M by the measurement of the displacement field $D(x,y,z)$ of the subject between these two images.

Figure 1:
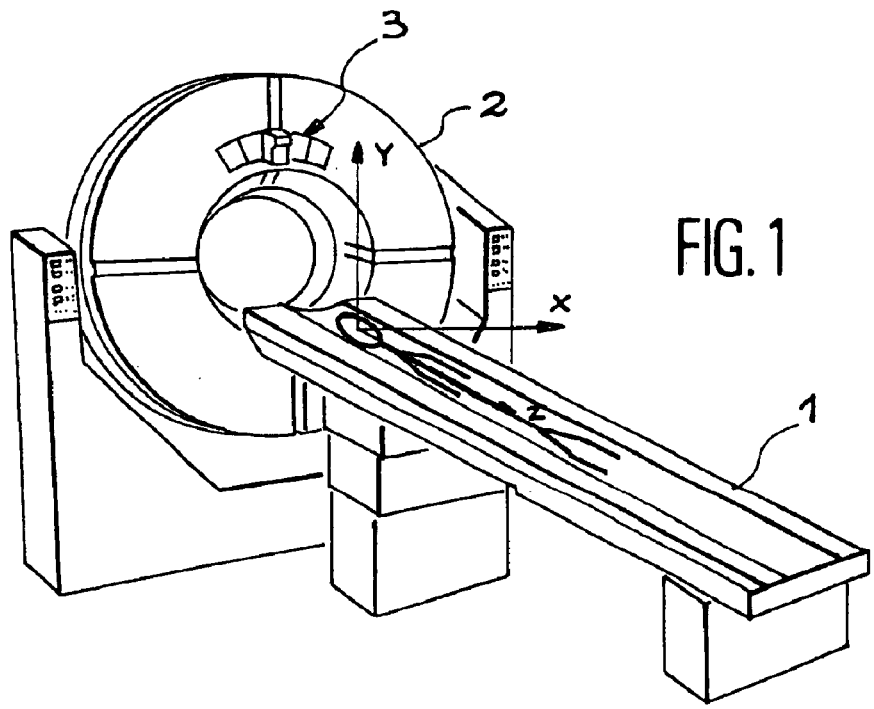
FIG. 1 is a view of the measurement taking device.
Figure 6:
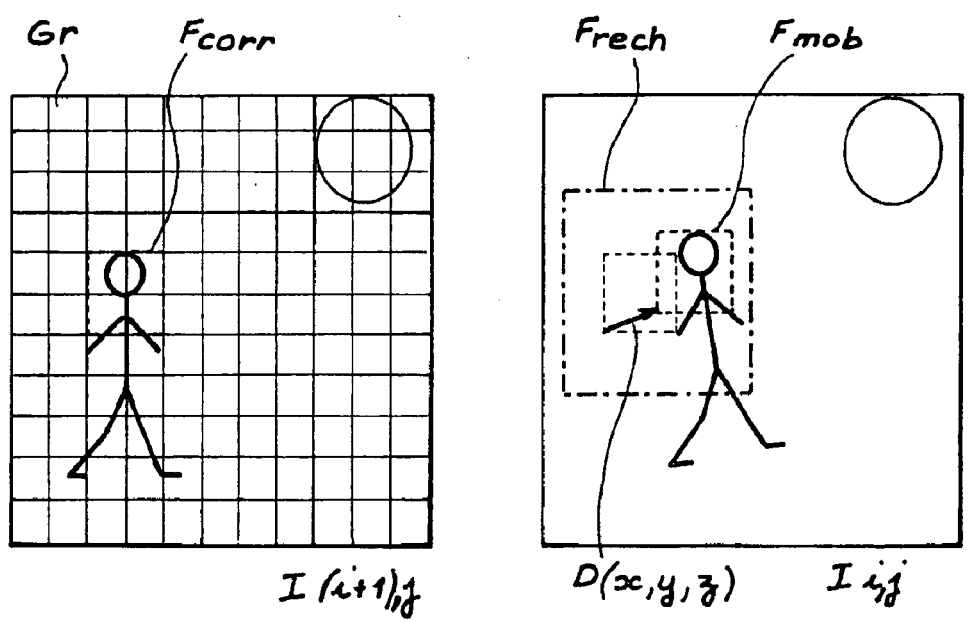
FIG. 6 shows the search for the subject displacement field.

The technique used is shown in FIG. 6 and comprises a series of successive correlations of blocks of voxels vu of the first reconstructed images. Undersampling of the measurements is adopted in one embodiment to accelerate the calculations, and successive blocks are grouped together to give the first images of the subject, which are blurred due to the lack of movement correction. Correlation may be made between the first images $I_{i,j}$ associated with the same groups j. A first prior image $I_{(i+1),j}$ thus obtained is divided using a grid Gr that delimits correlation windows $F_{corr}$. A mobile window $F_{mob}$ is displaced on a first subsequent image $I_{i,j}$ in a larger search window $F_{rech}$. A correlation score between the mobile window and the correlation window is calculated for each position of the mobile window $F_{mob}$, and this score is better when their contents are similar to each other. Four formulas for determining correlation scores are given below:

$$\Sigma |f_{i,j}(x,y,z) - f_{i+1,j}[(x,y,z) - D(x,y,z)]| \quad 1)$$

$$\Sigma (f_{i,j}(x,y,z) - f_{i+1,j}((x,y,z) - D(x,y,z)))^2 \quad 2)$$

$$\Sigma f_{i,j}(x,y,z) * f_{i+1,j}((x,y,z) - D(x,y,z)) \quad 3)$$

$$\frac{\sum f_{i,j}(x,y,z) f_{i+1,j}((x,y,z) - D(x,y,z))}{\sqrt{\sum f_{i,j}^2(x,y,z)} \sqrt{\sum f_{i+1,j}^2((x,y,z) - D(x,y,z))}} \quad 4)$$

It can be seen that the norm of the error on the difference of images is also a correlation score.

The difference in position between the correlation window $F_{corr}$ and the mobile window $F_{mob}$ that gives the best correlation score gives the estimate for the displacement field $D(x,y,z)$ for this portion of the subject between blocks $f_{(i-1),j}$ and $f_{i,j}$. The first images are calculated using at least three blocks of back projection results (one half-turn of the detection system 3). A larger arc than a half turn could also be chosen to give a better image. In this case, we will use the overscan technique to calculate them with four blocks, in this case all preceding the instant associated with the first image; therefore the earliest complete first image (in this case $I_{4,3}$) will be calculated with blocks between $\phi = -13\pi/3$ and $-3\pi$, the next first image ($I_{3,1}$) will be calculated using blocks between $\phi = -4\pi$ and $-8\pi/3$, etc., the image which will be correlated to $I_{4,3}$ ($I_{3,3}$) will be calculated using blocks between $-10\pi/3$ and $-2\pi$; the overscan of series of correlated blocks $I_{4,3}$ and $I_{3,3}$ with block $f_{b4,3}$ between $\phi = -10\pi/3$ and $-3\pi$ in common are observed.

This search is repeated on the entire subject and for all pairs of first images. Low resolution sampling on back projection blocks limits the duration of the calculations. Correlation calculations may be limited by some known algorithms such as the reduction in the gradient that consists of searching for the maximum correlation by moving the mobile window $F_{mob}$ in the search window $F_{search}$ in sequence along the three perpendicular axes. The search window $F_{search}$ may be made smaller and placed around the presumed position of the searched portion of $f_{i,j}$ if the displacements $D(x,y,z)$ are known approximately, but a longer exhaustive search is still possible.

Correlation scores between two images can be used to determine the confidence factors $C_{ij}$ mentioned above. If correlations are bad, and in particular if some details cannot be found from one block to the next, the confidence factors in this block will not be good and their influence will be reduced to reconstruction of the image.

Once the displacement fields $D(x,y,z)$ from one block to the next have been calculated, interpolations can be made between the different groups until the reference time; in the situation shown in FIG. 5, if $tr = t_{b1,3}$ and if the displacement field between $t_{b2,3}$ and $t_{b1,3}$ is $D(M)$, displacement fields equal to $$\frac{D(M)}{3}$$

will be applied to block $f_{b1,2}$, and $$\frac{2D(M)}{3}$$

to block $f_{b1,1}$, to accumulate blocks $f_{bj}$ correctly by applying formula (3).

In another embodiment of the process, there is no undersampling of the back projection results, and the complete contents of back projections is used to give the first images and the subject evolution law. This mode is possible if the processors in the equipment calculate the partial back projections quickly.

Figure 7:
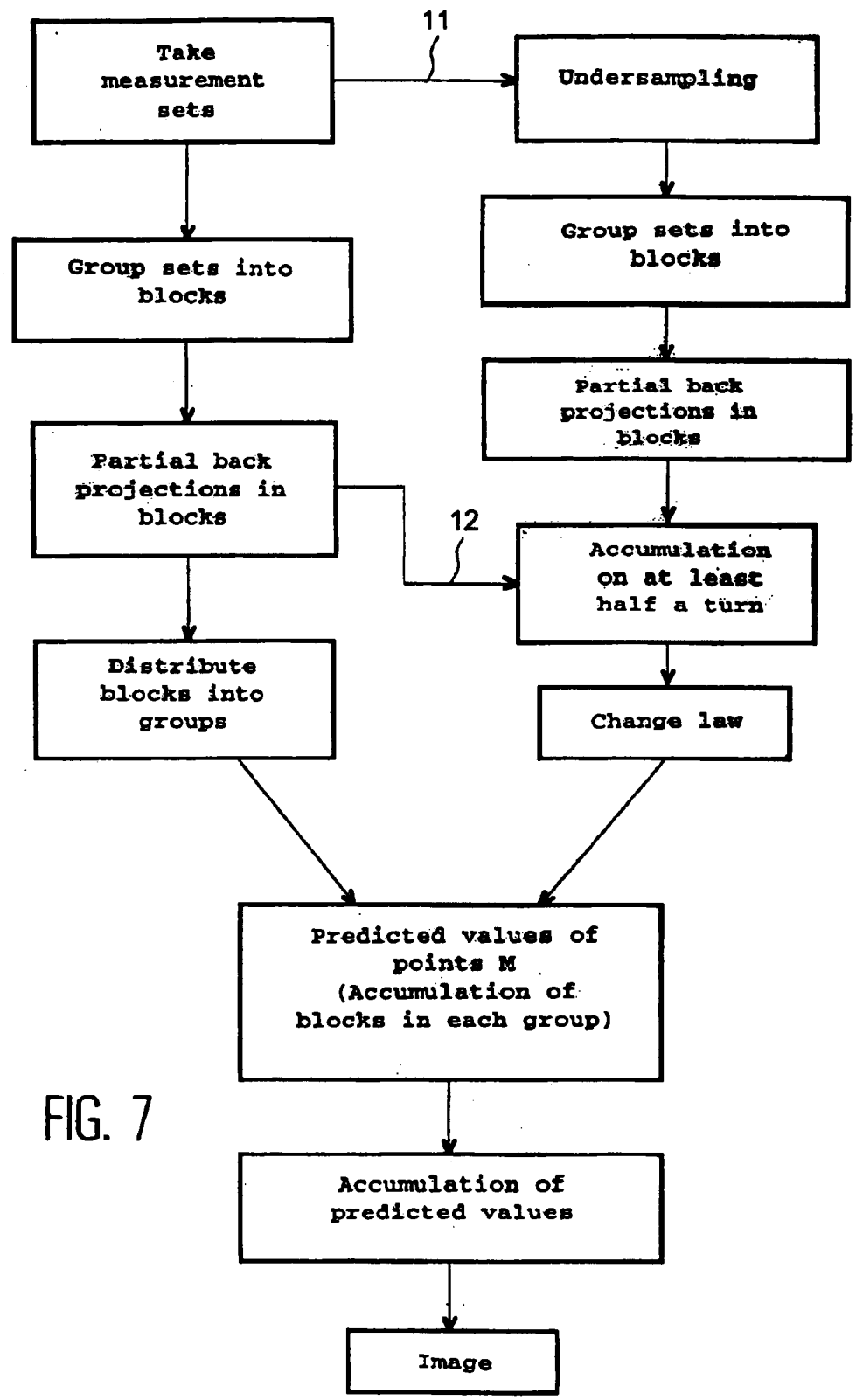
FIG. 7 is an organisation chart summarising the process.

FIG. 7 shows the summary flow chart of the process. The arrow 11 represents the use of undersampling, and the arrow 12 represents the use of complete back projections according to another embodiment mentioned above. In all cases, accumulated back projections give the first images of the subject. This FIG. 7 clearly shows the double path used to gradually reconstruct the image with blocks on successive half turns of the detectors network and to evaluate the movement or other transformations of the subject using first images obtained with successive blocks.

A correction for the known spectrum hardening phenomenon may be applied to this invention in order to make a better distinction between contributions of tissues and of bones to the global attenuation of the subject in the case of a patient.

The process can also be applied to reconstruction of a series of images, by repeating it at angular intervals the same as the angular interval considered (from $-4\pi$ to 0), before it (from $-8\pi$ to $-4\pi$) or after it (from 0 to $4\pi$). These images are calculated separately, but considering a continuous set of measurements and back projection blocks, which can also help to make reconstructions of consecutive images as was mentioned for the overscan block between $-13\pi/3$ and $-4\pi$, which would also be useful for reconstruction of the image between $-8\pi$ and $-4\pi$. The invention is also based on the use of a "sliding window" to isolate useful blocks, but that can be moved freely after the reference time considered.

Modifications to the chosen angular sectors, to the number of sectors, their extent (individual or total) and the reference time within this extent, and other factors, would only be minor and remain within the scope of this invention.

What is claimed is:

1. Process for reconstruction of an image of a moving subject, including taking a set of successive measurements of the subject on projection rays passing through the subject, through a network (4) of detectors (5) at corresponding incidences around the subject, a measurement back projection step and a correction step following a subject change law, characterised in that the back projection step is made in several steps to give corresponding blocks ($f_b$) of back projection results, each of the blocks grouping projection rays taken only for an angular sector of a turn of the detectors network using measurement quantities that are insufficient to genuinely express the required image; the subject change law is estimated based on the first images obtained by accumulating back projection blocks on at least half a turn of incidences of the detectors network; and the back projection result blocks are combined after they have been corrected using the subject change law to give the image at a reference time ($t_r$).

2. Process for reconstruction of a three-dimensional image according to claim 1, characterised in that the change law includes variations of the appearance of the subject with time.

3. Process for reconstruction of a three-dimensional image according to claim 2, characterised in that the said variations are estimated by regression calculations between the corresponding portions in the first images derived from the results of back projection blocks.

4. Process for reconstruction of a three-dimensional image according to any one of claims 1 to 3, characterised in that the change law includes displacements D(x,y,z) of portions of the subject.

5. Process for reconstruction of a three-dimensional image according to claim 4, characterised in that the said displacements are estimated by distance searches between similar portions of the said first images of the subject obtained by accumulating successive back projection blocks.

6. Process for reconstruction of a three-dimensional image according to any one of claims 1 to 5, characterised in that the subject change law is obtained within groups of back projection result blocks, the back projection result blocks are combined firstly within groups to give a fragment of the content of the image at the reference instant, and the image is obtained by adding the said fragments, the angular sectors of the blocks in the same group being separated either by a half-turn or a complete turn.

7. Process for reconstruction of a three-dimensional image according to any one of claims 1 to 6, characterised in that the subject change law is estimated from undersampling of the projections.

8. Process for reconstruction of a three-dimensional image according to any one of claims 1 to 6, characterised in that the subject change law is estimated from a complete sampling of the projections.

9. Process for reconstruction of a three-dimensional image according to claim 5, characterised in that the first images are submitted to undersampling before the said displacements are estimated.

10. Process for reconstruction of a three-dimensional image according to claim 6, characterised in that the subject change law is updated while measurements sets are taken.

11. Process for reconstruction of a three-dimensional image according to any one of claims 1 to 10, characterised in that confidence factors $C_{ij}$ are calculated for each block ($F_{bi,j}$) once the subject change law has been obtained, and blocks are weighted as a function of the said factors, before being combined.

* * * * *